United States Patent [19]
Leviton

[11] Patent Number: 5,965,879
[45] Date of Patent: Oct. 12, 1999

[54] METHOD AND APPARATUS FOR ULTRA-HIGH-SENSITIVITY, INCREMENTAL AND ABSOLUTE OPTICAL ENCODING

[75] Inventor: Douglas B. Leviton, Dunkirk, Md.

[73] Assignee: The United States of America as represented by the Administrator of the National Aeronautics and Space Administration, Washington, D.C.

[21] Appl. No.: 08/852,778

[22] Filed: May 7, 1997

[51] Int. Cl.[6] .................................................. G01D 5/34
[52] U.S. Cl. ............................... 250/231.13; 250/231.18
[58] Field of Search ..................... 250/231.13, 231.18, 250/231.16, 237 G; 356/375

[56] References Cited

U.S. PATENT DOCUMENTS

5,563,408  10/1996  Matsumoto et al. ............... 250/231.16

Primary Examiner—Que Le
Attorney, Agent, or Firm—Keith Dixon

[57] ABSTRACT

An absolute optical linear or rotary encoder which encodes the motion of an object (3) with increased resolution and encoding range and decreased sensitivity to damage to the scale includes a scale (5), which moves with the object and is illuminated by a light source (11). The scale carries a pattern (9) which is imaged by a microscope optical system (13) on a CCD array (17) in a camera head (15). The pattern includes both fiducial markings (31) which are identical for each period of the pattern and code areas (33) which include binary codings of numbers identifying the individual periods of the pattern. The image of the pattern formed on the CCD array is analyzed by an image processor (23) to locate the fiducial marking, decode the information encoded in the code area, and thereby determine the position of the object.

20 Claims, 8 Drawing Sheets

METHOD AND APPARATUS FOR ULTRA-HIGH-SENSITIVITY, INCREMENTAL AND ABSOLUTE OPTICAL ENCODING

ORIGIN OF INVENTION

The invention described herein was made by an employee of the United States Government, and may be manufactured and used by or for the Government for governmental purposes without the payment of any royalties thereon or therefor.

TECHNICAL FIELD

The invention is directed to a method and apparatus for determining both incremental and absolute linear or angular positions through optical encoding.

BACKGROUND ART

An optical encoder measures a position of an object, either angular or linear, by optically detecting marks on a scale attached to the object to move with the object. In the simplest form, the encoder simply measures translation by counting the number of marks that move past the encoder's optical detector.

In a common form of such an encoder, a fixed scale and a moving scale, which have identical transparent markings on opaque backgrounds, are interposed between a light source and the detector. The relative locations of the transparent markings determine the amount of light which is allowed to be transmitted through each marking, e.g., full transmission, ½ or ¼ transmission, or none at all. Of course, such an encoder can measure only relative displacement with respect to a reference position—not absolute position.

In a conventional absolute encoder, each position is given not simply by just one mark, but by a unique code pattern of marks which identifies the absolute position. A change in position is sensed by detecting a change in the code bits which make up the code pattern. Some absolute encoders can derive position information at rates higher than 100 kHz.

In an absolute encoder such as the one just described, sensitivity is limited to the size of the smallest code bit which can be recorded, which is in turn limited by physical optics to about the wavelength of the light used to record and detect the code patterns. Thus, the best sensitivity available from such an absolute encoder is somewhat less than 1 $\mu$m of translation. Also, such an encoder is limited in the amount of travel that it can accommodate. For instance, such an encoder which uses 12-bit code patterns can encode up to $2^{12}=4,096$ positions. With a sensitivity of just under 1 $\mu$m, the maximum travel which can be detected is around 4,000 $\mu$m, or four millimeters. Moreover, because the code bits themselves are detected, damage to the scale can result in dead spots in which derived position information is anomalous.

STATEMENT OF THE INVENTION

It is an object of the invention to achieve an absolute encoder with higher sensitivity than that of conventional absolute encoders.

It is a further object of the invention to achieve an absolute encoder which can encode longer travel distances than is possible with conventional absolute encoders without a loss of resolution.

It is a further object of the invention to achieve an absolute encoder with reduced sensitivity to dead spots caused by damage to the scale.

It is a further object of the invention to achieve an absolute encoder which offers the advantages noted above while being inexpensive to manufacture.

It is a further object of the invention to achieve an encoder which can detect position either absolutely or incrementally.

To achieve these and other objects, the present invention is directed to an absolute optical encoder comprising: a scale having a pattern formed thereon, the pattern having a plurality of periods, each of the plurality of periods including (a) a first portion which is identical for all of the plurality of periods and (b) a second portion which identifies a particular one of the plurality of periods; means for attaching the scale to the object to cause the scale to move with the object; means for illuminating the scale; means for receiving light from the scale, the means for receiving comprising detector means for forming an image of one of the plurality of periods of the pattern which lies within a field of view of the detector means and for outputting signals derived from the image, the field of view defining a fixed coordinate system; and analyzing means, receiving the signals from the detector means, for (i) determining a location of the first portion of the one of the plurality of periods within the fixed coordinate system, (ii) decoding the second portion of the one of the plurality of periods to derive an identity of the one of the plurality of periods; and (iii) determining the absolute location of the object in accordance with the location of the first portion determined in operation (i) and the identity determined in operation (ii).

The invention is further directed to a method of determining an absolute position of an object, the method comprising: (a) providing a scale having a pattern formed thereon, the pattern having a plurality of periods, each of the plurality of periods including (i) a first portion which is identical for all of the plurality of periods and (ii) a second portion which identifies the particular one of the plurality of periods; (b) attaching the scale to the object to cause the scale to move with the object; (c) forming an image of one of the plurality of periods of the pattern which lies within a field of view, the field of view defining a fixed coordinate system; (d) determining, in accordance with the image, a location of the first portion of the one of the plurality of periods within the fixed coordinate system; (e) decoding, in accordance with the image, the second portion of the one of the plurality of periods to derive an identity of the one of the plurality of periods; and (f) determining the absolute location of the object in accordance with the location of the first portion determined in step (d) and the identity determined in step (e).

Such an encoder and method can achieve absolute encoding with the first and second portions or incremental encoding with the first portion alone.

The encoder and method according to the present invention use mature technologies such as microlithography, optical projection, CCD array image detection and simple computational image processing. However, the specific use of a combination of such mature technologies according to the present invention allows results, such as those stated above, which were not possible through the use of heretofore known encoders.

BRIEF DESCRIPTION OF THE DRAWINGS

The preferred embodiments of the invention will now be described in detail with reference to the figures, in which.

DETAILED DESCRIPTION OF THE INVENTION

Figure 1:
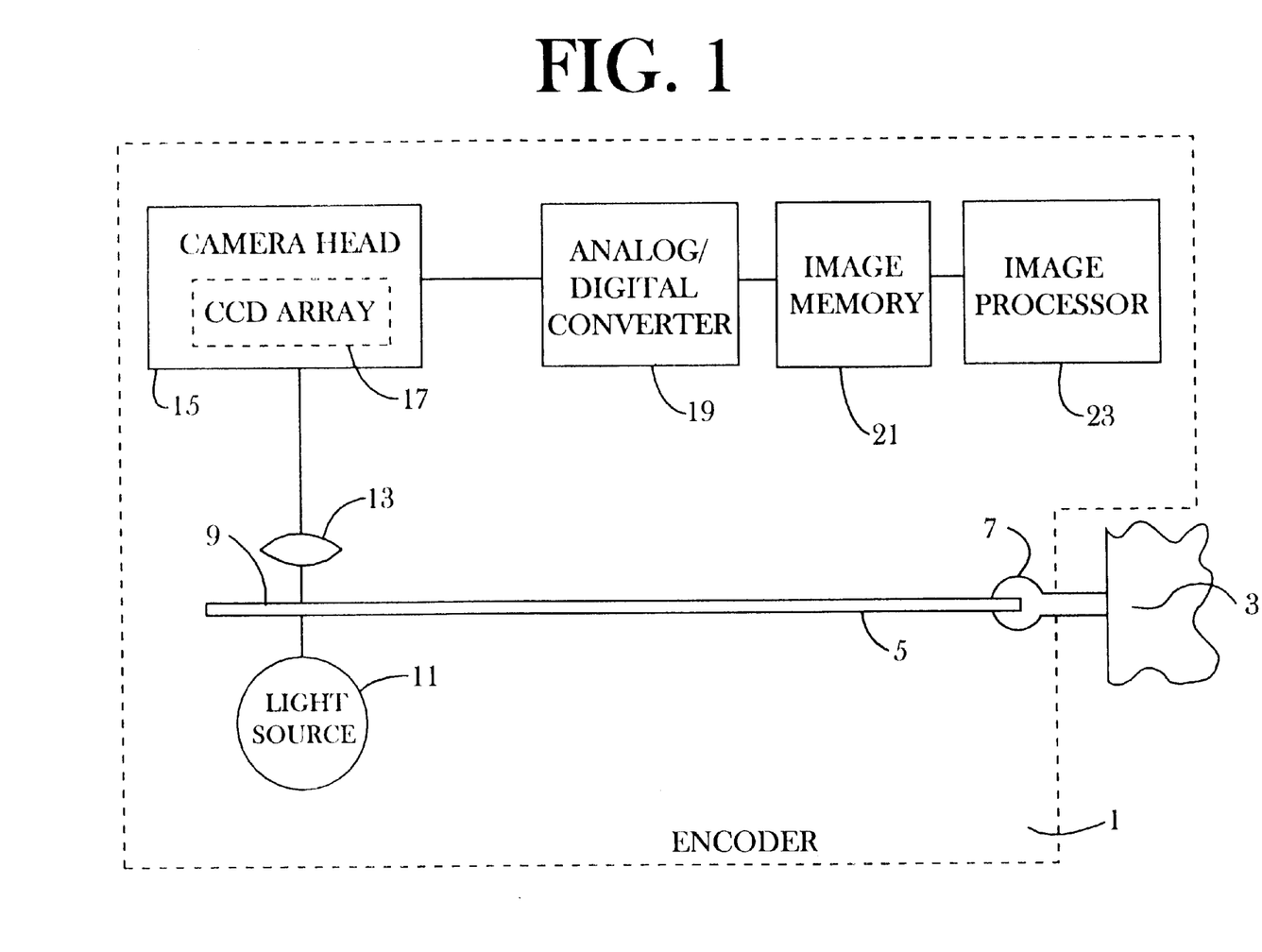
FIG. 1 shows a block diagram of a linear encoder in accordance with a first preferred embodiment of the present invention.

FIG. 1 shows a linear encoder in accordance with the first preferred embodiment of the invention, in which encoder 1 determines the linear displacement of object 3, which moves linearly in a direction perpendicular to the plane of the drawing. Encoder 1 includes scale 5, which is rigidly attached to object 3 by attachment 7 so that pattern 9 on scale 5, which will be described in detail below, is carefully aligned with the direction of motion of object 3. It is also possible to hold the scale fixed and to attach the light source and detector to the object to encode, e.g., movement along a railroad track. Scale 5 is preferably made of glass, with transparent pattern 9 on an opaque background. Pattern 9 is preferably formed on top of scale 5. Stationary light source 11, which preferably outputs visible light, illuminates scale 5 from below. Other modes of illumination, such as edge illumination, can be used instead. Light transmitted through scale 5 is made incident on stationary microscope arrangement (or other optical projecting arrangement) 13, which projects an image of a portion of pattern 9 onto camera head 15. In camera head 15, CCD array 17 detects the image of the scale as individual picture elements (pixels). Signals corresponding to the individual pixels are output by CCD array 17 to analog/digital converter 19, which digitizes the signals to produce digital data and outputs the digital data to image memory 21. Image processor 23 analyzes the digital data stored in image memory 21 to produce absolute translational information about object 3.

Figure 2:
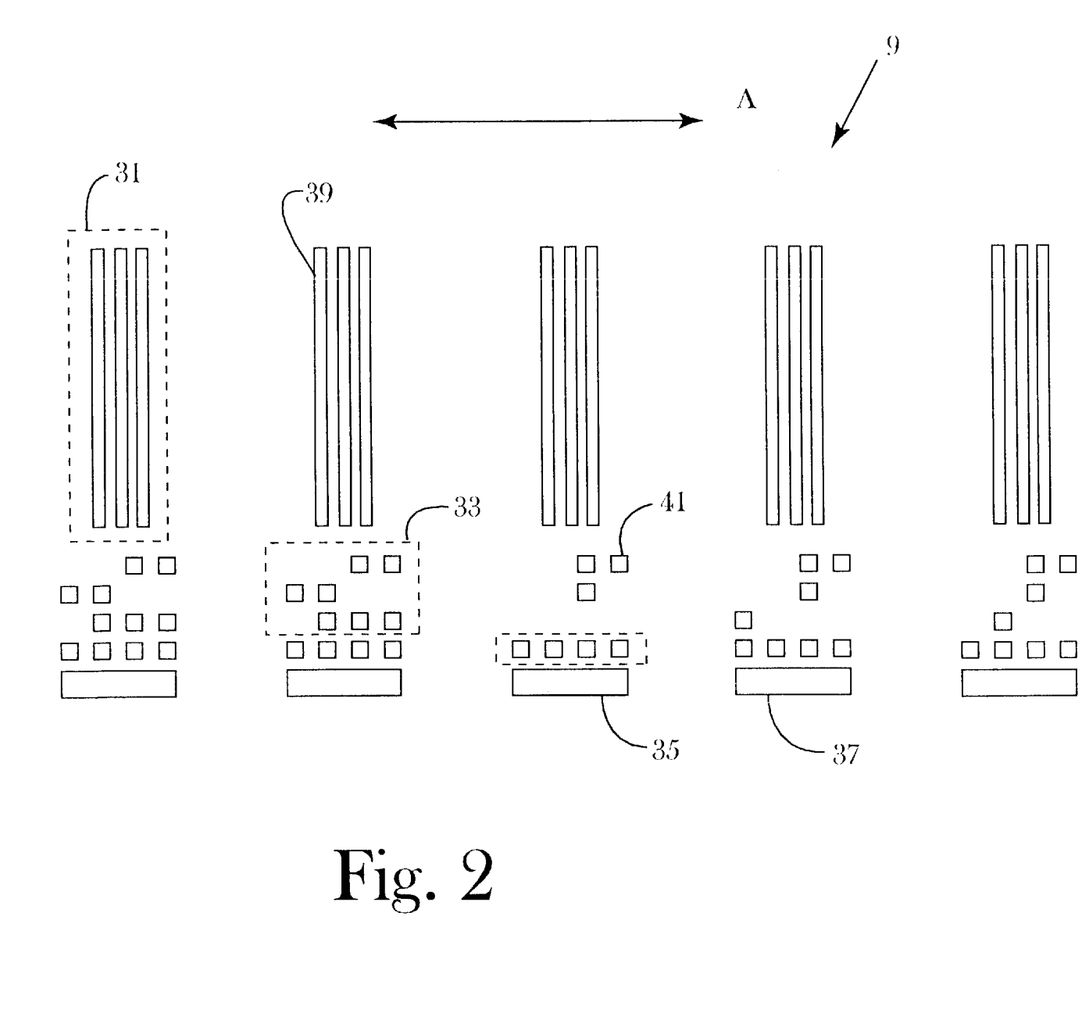
FIG. 2 shows a pattern of scale markings in the linear encoder of FIG. 1.

FIG. 2 shows a portion of pattern 9. As noted above, pattern 9 is carefully aligned with direction A of movement of the object. Pattern 9 includes fiducials 31, code areas 33, column markers 35 and row markers 37.

The fiducials are identical across all encoded positions and are arranged in a manner which is strictly periodic in direction A of movement. In the present embodiment, each of the fiducials includes three bars 39 aligned to be perpendicular to direction A, although other forms can be used as needed.

Column markers 35 and row markers 37 are used to relate the image of pattern 9 to the coordinate system defined by pixels of the image sensing detector 17 of FIG. 1.

Between fiducials 31 and column markers 35 are code areas 33, which are arrays of code bits 41. Each code area 33 uniquely identifies a corresponding one of fiducials 31. Code bits 41 in each code area 33 form a binary code. Any binary code which is convenient can be employed. In the present embodiment, each code area 33 includes a 4×3 array of code bits 41 and thus provides a 12-bit code with 4,096 possible values.

Figure 3:
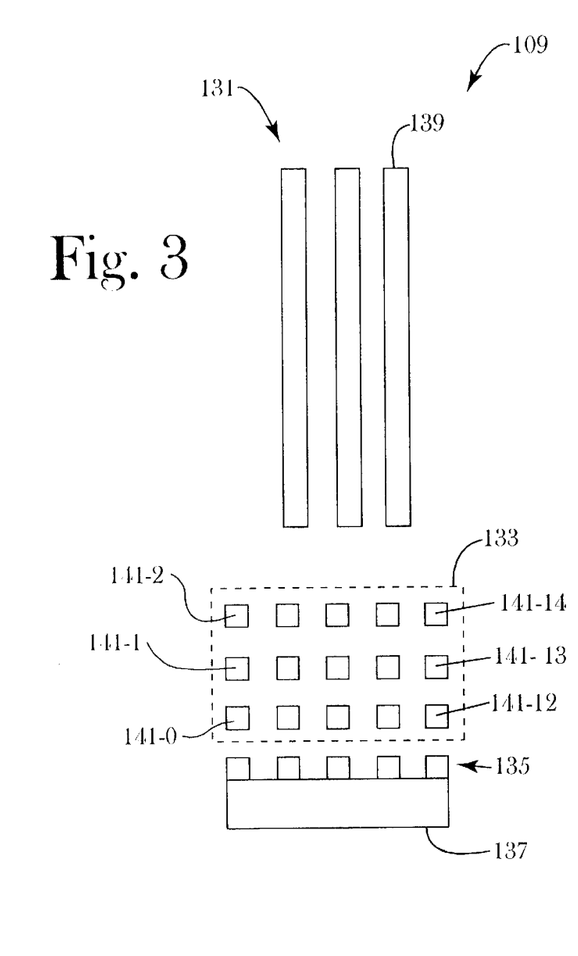
FIG. 3 shows an alternative pattern of scale markings in the linear encoder of FIG. 1.

A single period of another possible pattern, namely, pattern 109, is shown in greater detail in FIG. 3. Pattern 109 is formed at a resolution of 5 μm and thus may be considered to be made of square portions which measure 5 μm on a side. Each fiducial 131 includes three bars 139 which are 5 μm in width and spaced with their centers 10 μm apart. Column marker 135 and row marker 137 provide column and row definitions, respectively, for code area 133. Code area 133 is shown as being for a 15-bit code and includes code bits for the 0th through 14th bits of the coding scheme; for clarity, only code bits 141-0 through 141-3 and 141-12 through 141-14 are labeled in the figure. The period of pattern 109 is 80 μm.

Figure 4:
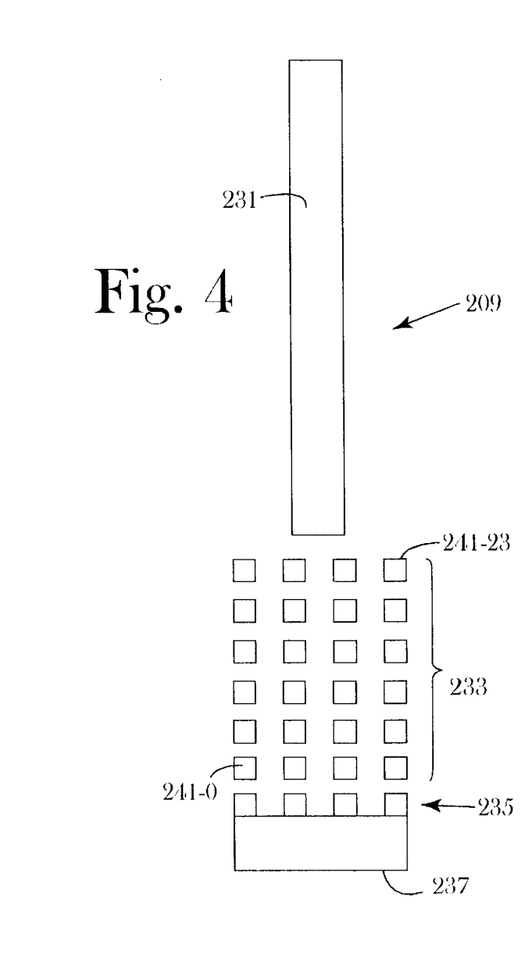
FIG. 4 shows another alternative pattern of scale markings in the linear encoder of FIG. 1.

FIG. 4 shows a single period of yet another possible pattern 209. Here, fiducial 231 includes single vertical bar 239 which is 10 μm wide. Code area 233 allows for a 24-bit code with code bits for the 0th through 23rd bits of the coding scheme; for clarity, only code bits 241-0 and 241-23 are labeled in the figure. Column marker 235 and row marker 237 provide column and row definitions. The period of pattern 209 is 80 μm.

Figure 5A:
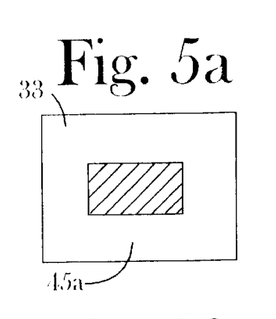
FIGS. 5a–5o show binary encodings of different numerical values in the scale markings of FIG. 2.
Figure 5B:
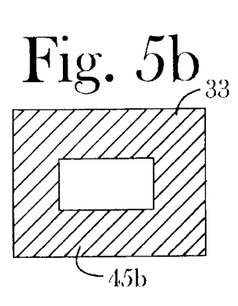
Figures 5C, 5D:
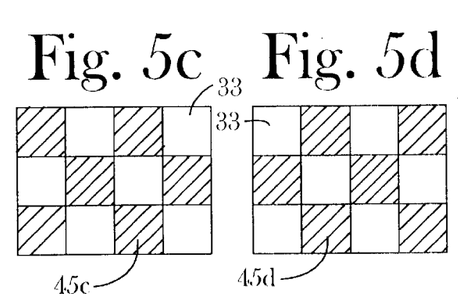
Figure 5E:
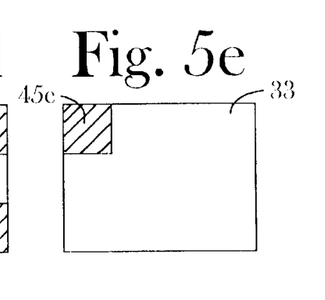
Figure 5F:
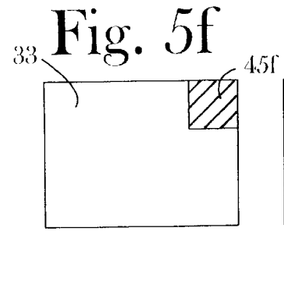
Figure 5G:
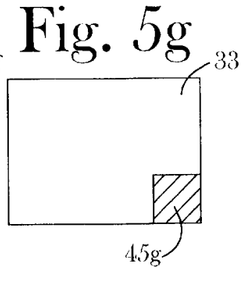
Figures 5H, 5I:
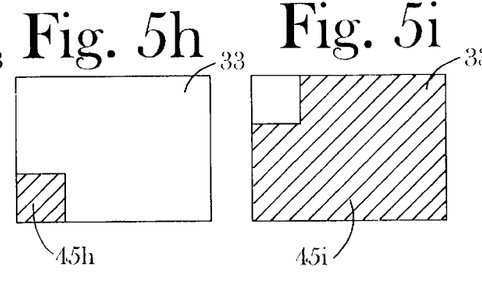
Figure 5J:
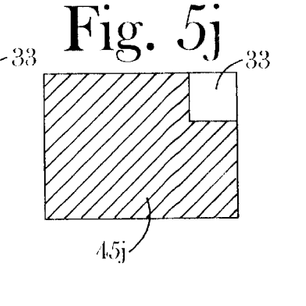
Figure 5K:
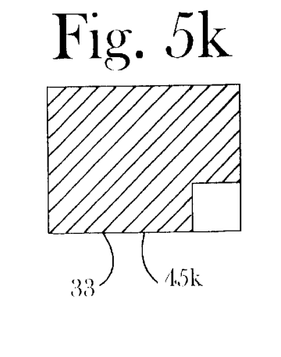
Figure 5L:
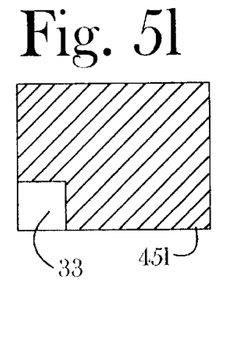
Figure 5M:
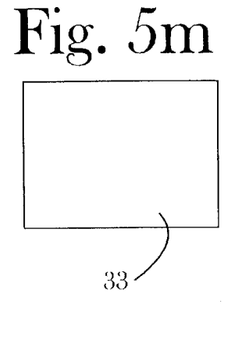
Figure 5N:
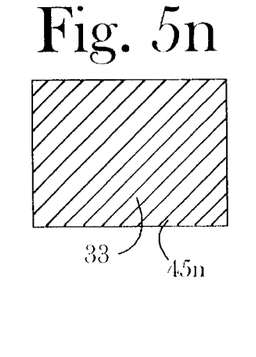
Figure 5O:
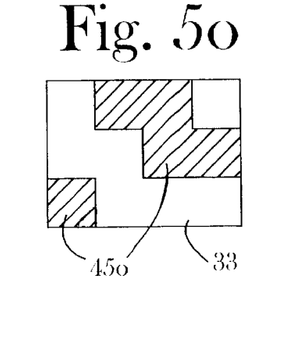

FIGS. 5a–5o show the encoding of different values in code area 33 of FIG. 2. In code area 33, cameral pixels identifying bits having a binary value of one form a region such as regions 45a–45l, 45n and 45o; such a region is shown in the figures as shaded for ease of understanding. When the value to be encoded is zero, as shown in FIG. 5m, there is, of course, no such region. The table below gives the values:

| FIG. | Value expressed in binary | Value expressed in decimal |
| --- | --- | --- |
| 5a | 0000 0110 0000 | 96 |
| 5b | 1111 1001 1111 | 3,999 |
| 5c | 0101 1010 0101 | 1,445 |
| 5d | 1010 0101 1010 | 2,650 |
| 5e | 0001 0000 0000 | 256 |
| 5f | 1000 0000 0000 | 2,048 |
| 5g | 0000 0000 1000 | 8 |
| 5h | 0000 0000 0001 | 1 |
| 5i | 1110 1111 1111 | 3,839 |
| 5j | 0111 1111 1111 | 2,047 |
| 5k | 1111 1111 0111 | 4,087 |
| 5l | 1111 1111 1110 | 4,094 |
| 5m | 0000 0000 0000 | 0 |
| 5n | 1111 1111 1111 | 4,095 |
| 5o | 0110 1100 0001 | 1,729 |

Figure 6A:
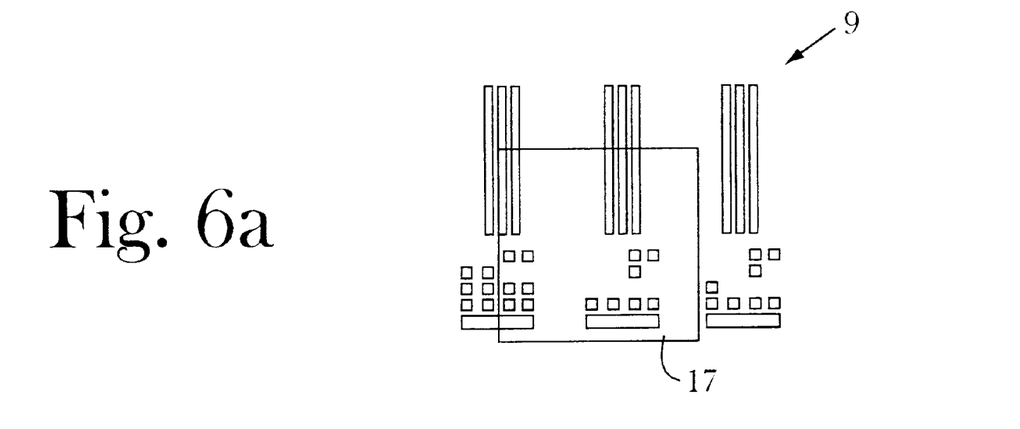
FIG. 6a shows relative positions of the pattern of scale markings and a CCD array in the linear encoder of FIG. 1 at a first point in time.
Figure 6B:
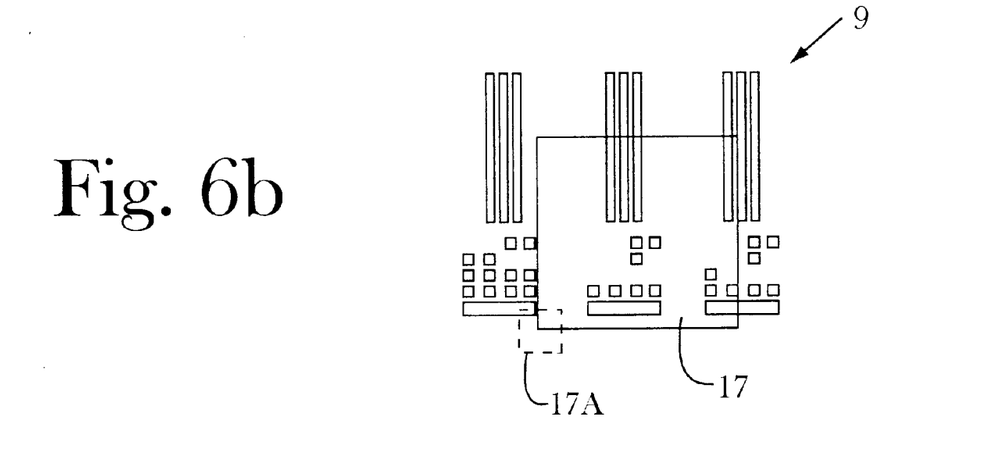
FIG. 6b shows relative positions of the pattern of scale markings and the CCD array in the linear encoder of FIG. 1 at a second point in time.
Figure 6C:
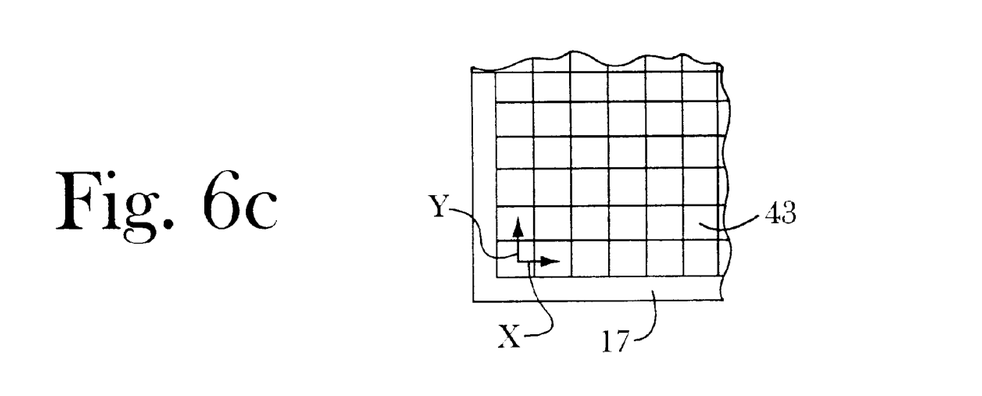
FIG. 6c shows an enlargement of a portion of the CCD array in the linear encoder of FIG. 1.

FIGS. 6a and 6b show images of pattern 9 formed on CCD array 17 at two times as the object moves. As shown in FIG. 6c, which shows a magnification of region 17A of FIG. 6b, CCD array 17 includes an array of photodetector elements 43 which resolve the images into pixels. The array of photodetector elements defines a fixed coordinate system. Individual photodetector elements 43 range in size, depending on the specific CCD array used, from 7 μm to 25 μm. In one prototype built by the inventor, individual photodetector elements 43 measured 13.75 μm in the direction of motion of the scale by 16 μm in the perpendicular direction. CCD array 17 may be replaced by a charge injection device (CID) array. In a CID, the individual elements are addressable. A CID array offers the advantage of speed, while a CCD offers the advantage of accuracy (less noise). Still another option is to use a RAM chip without a casing so that light can reach the transistors of the RAM chip. While such a RAM chip can achieve a color depth of only one bit (i.e., no gray scale), it provides extremely high speeds (10 kHz–1 MHz with no penalty) and simplified circuitry for data analysis.

Figure 7:
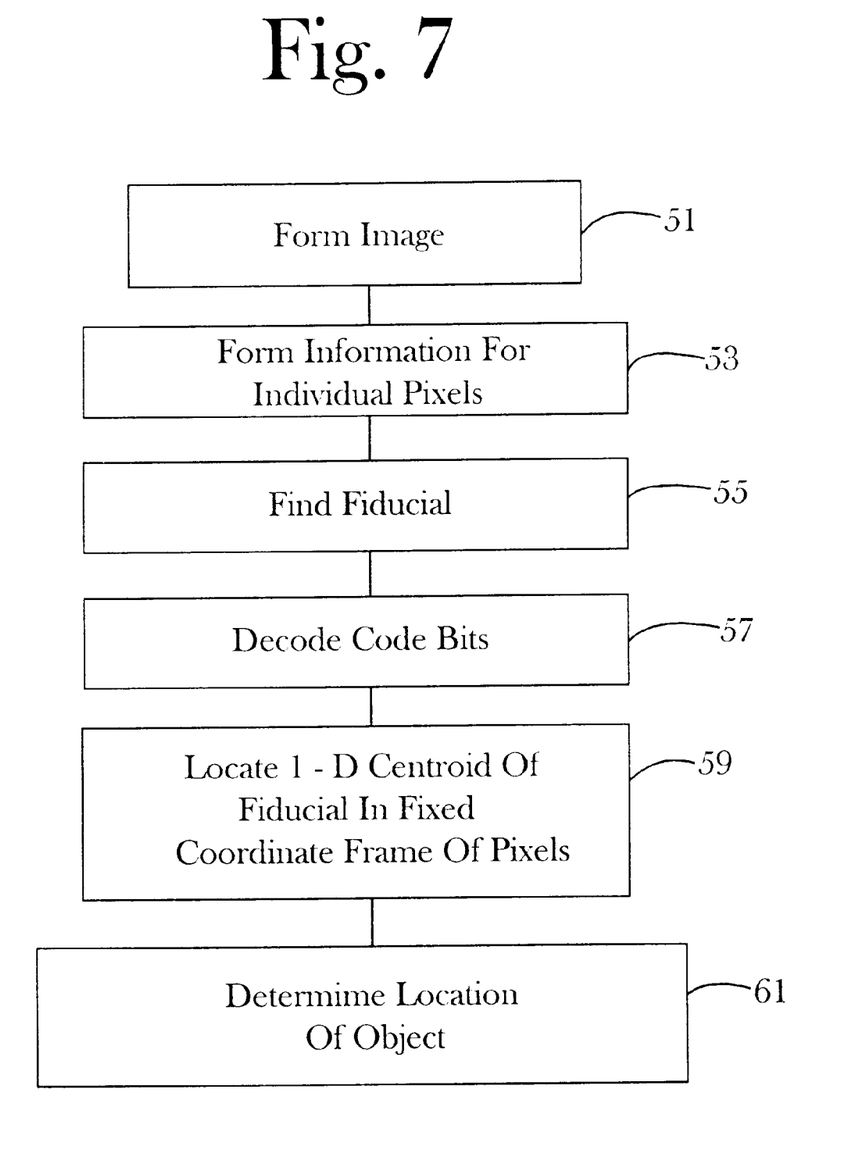
FIG. 7 shows a flow chart of a method of determining an absolute linear position of an object by using the linear encoder of FIG. 1.

The manner in which encoder 1 uses pattern 9 (109, 209) to determine the position of the object will now be explained with reference to the flow chart of FIG. 7. Once the image is formed on CCD array 17 (step 51) and information is formed for individual pixels (step 53), analog/digital converter 19 digitizes the pixel information from CCD array 17 and provides that information to memory 21. The physical locations of photodetector elements 43 of CCD array 17 are fixed references for a stationary coordinate frame used to define the positions of pattern 9 shown in FIGS. 6a and 6b. Image processor 23, which may be any appropriately programmed computer, derives the position information for the moving object in accordance with the relationship between the coordinate frame and the pixel locations using an operation which performs two main functions: (1) identifying the image of at least one fiducial on the detector by not only finding the pattern of the fiducial itself (step 55) but also by decoding the image of the pattern of code bits associated with only that fiducial, guided by the pattern of markers for those code bits (the markers are present and identical for every fiducial) (step 57); and (2) establishing the positional relationship of that image to the stationary, reference coordinate frame given simply by pixel array indices (step 59). The location of the fiducial in relation to the stationary coordinate frame and the value encoded in the code area suffice to give the location of the object (step 61).

The purpose of step 59 is to determine the position of the image of the fiducial with respect to the pixel coordinate frame along the direction of motion and to thereby encode the motion. Any number of computational operations can be used to perform this function, including edge detection, peak detection, derivative, etc. However, the preferred embodiment of the encoding system computes the one-dimensional centroid of the fiducial in the direction of motion in the fixed coordinate system.

Such an encoder can also perform incremental encoding by detecting only the fiducials, as is done by conventional incremental encoders.

Figure 8:
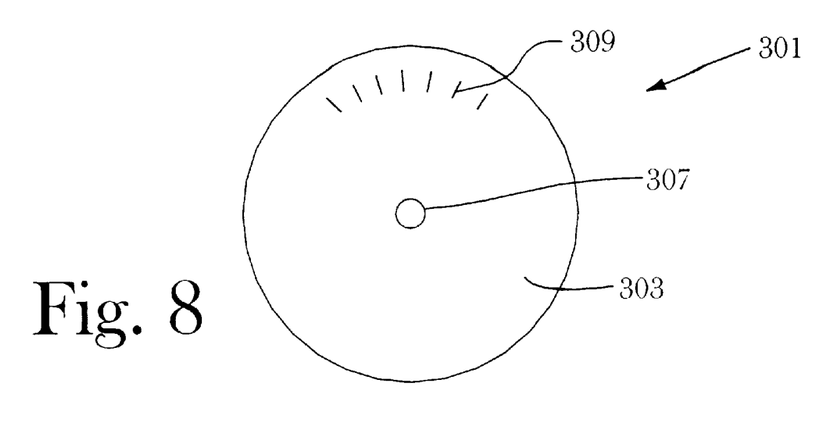
FIG. 8 shows components of a rotary encoder according to a second preferred embodiment of the present invention.

FIG. 8 shows components of a rotary encoder in accordance with a second preferred embodiment of the invention. The rotary encoder of the second preferred embodiment is constructed like linear encoder 1 of the first preferred embodiment, except for differences which will now be noted.

Figure 9:
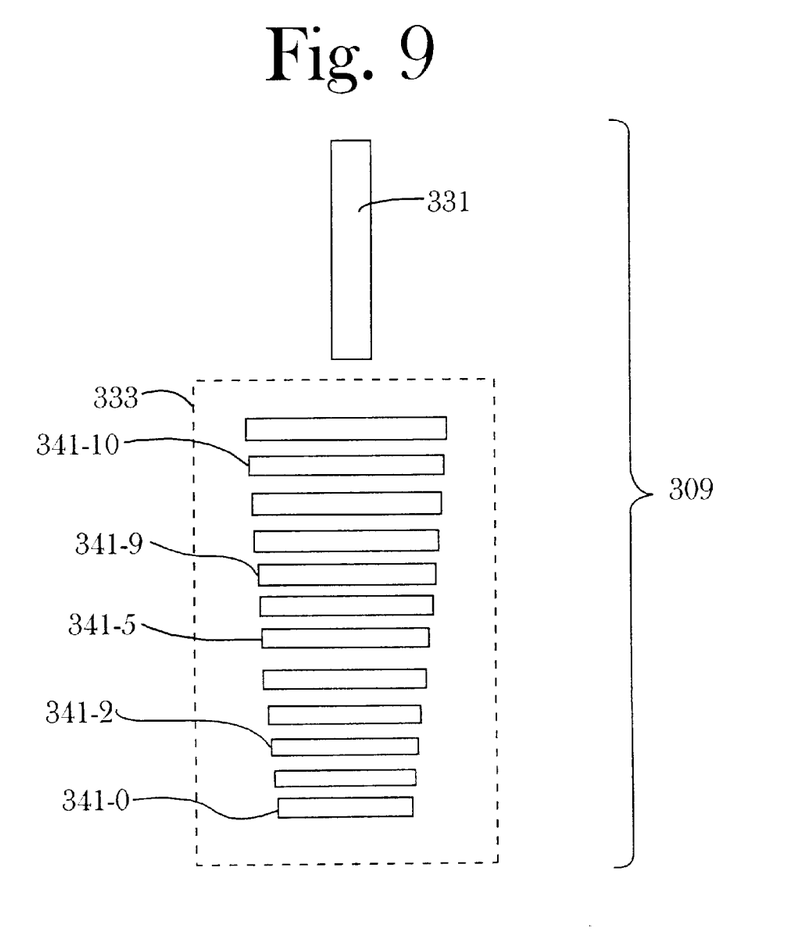
FIG. 9 shows a pattern of scale markings in the rotary encoder of FIG. 8.

In rotary encoder 301, scale 303 is mounted to rotate coaxially with an object (not shown) by means, for example, of axle 307 or of a hollow bearing. Scale 303 has pattern 309 formed thereon. Pattern 309 is laid out in a polar rather than a Cartesian coordinate frame. The scale is not required to be backlit, but can instead be edge-illuminated. As shown in FIG. 9, each period of pattern 309 includes fiducial 331 and code area 333. Pattern 309 has a period of 60 μm. Code area 333 has a 12-bit encoding scheme with twelve pixels. Of these pixels, pixels 341-0, 341-2, 341-5, 341-7 and 341-10 indicate bit values of one and are shown in the figure as shaded for ease of understanding, while the rest indicate bit values of zero. Thus, the position encoded by this code area is position no. 1,189. If scale 303 is just over 10 cm in diameter, such a 12-bit coding scheme provides an angular sensitivity of less than 20 milliarc-seconds. Code area 333 could also be formed as in the first embodiment.

Figure 10:
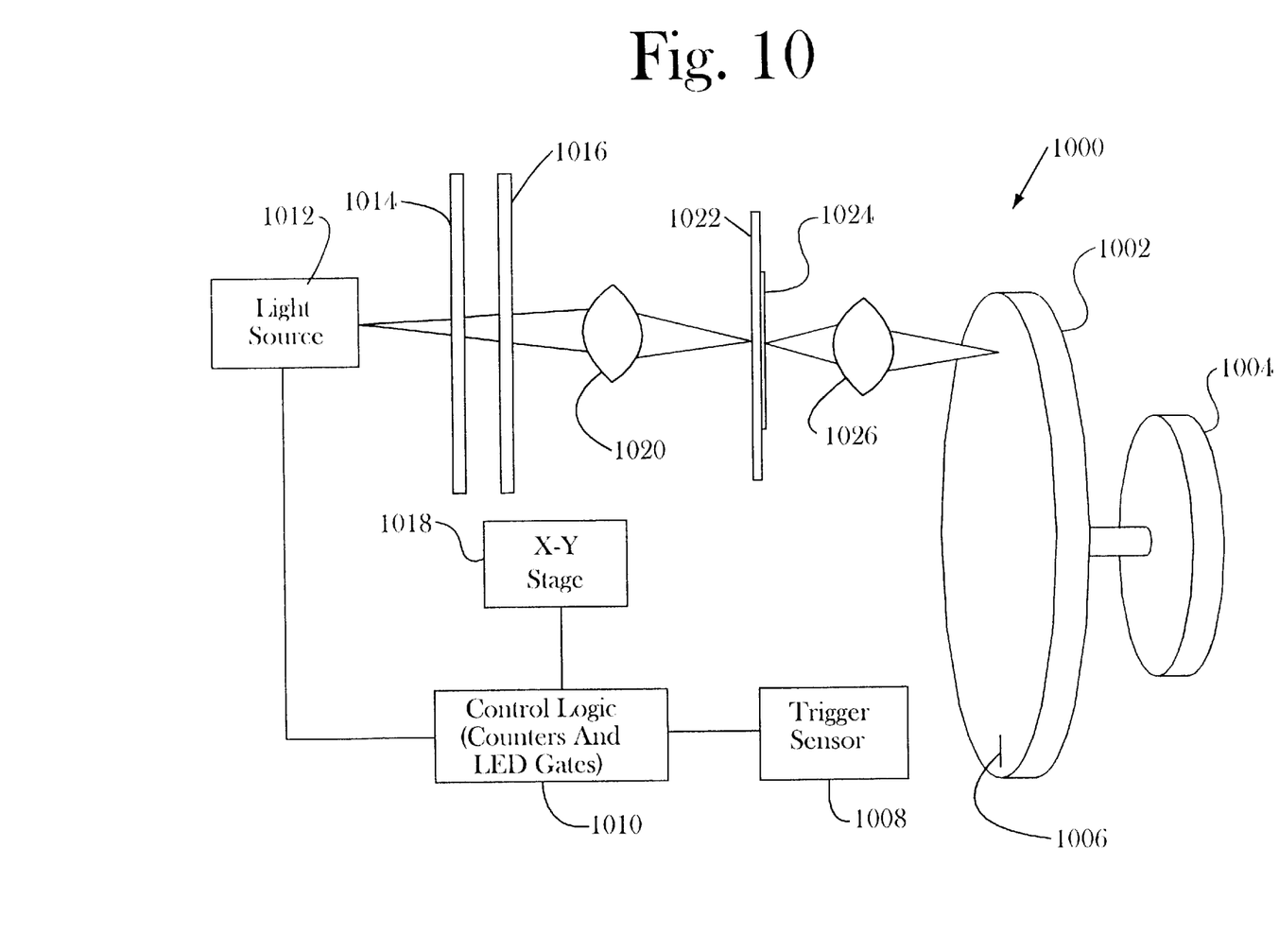
FIG. 10 shows an operative for making a scale used in the rotary encoder of FIG. 8.

A highly accurate, rotary version of the encoding scale can be made with an electro-optical system in the following manner, which will be described with reference to FIG. 10.

A temporally-gated, electro-optical system writes rotary scales for rotary versions of this type of ultra-high sensitivity optical encoder. As seen in FIG. 10, system 1000 includes photosensitive scale substrate 1002, which is attached to flywheel 1004 to spin with the flywheel at a highly stabilized angular rate and which has trigger mark 1006 thereon, trigger sensor 1008 to sense trigger mark 1006 and to output trigger signals, control logic (counters and gates) 1010, receiving the trigger signals, to control the pulsed illumination by pulsed light source 1012 (which may be an LED or a flashlamp) whose spectrum and brightness are capable of exposing photosensitive scale substrate 1002, master mask 1014 and sub-master mask 1024 that govern specific locations on the substrate which will be exposed, and optics 1020, 1022, 1026 to relay the illuminated master mask through the sub-master mask to the scale substrate.

Master mask 1014 is a large version of the basic encoder pattern containing the fiducial bars, the row marker, and all code bits. It is large enough that it can be easily subapertured to allow the projection of only one marker, fiducial, or code bit at a time. That subaperturing can be handled by moving subaperturing mask 1016 around and over the master mask with motorized (or manual) X-Y stage 1018. Reducing optics 1020 relay the master mask plane to an intermediate submaster mask plane having diffuser 1022 and submaster mask 1024 where the optical pattern is refined, redefined, or cleaned up before being relayed again by further reducing optics 1026 to the plane containing the spun photosensitive scale substrate.

The relay optics for this scale encoding scheme could be done in one stage without an intermediate submaster mask. Choosing which master scale patterns are projected at any time could also be accomplished near the plane of the master mask itself.

Each portion of a pattern is written in turn onto the scale substrate: the fiducial bars, then the marker bars, then code bit 0, then code bit 1, then code bit 2, and so on. Control logic 1010 controls the illumination of master mask 1014 by light source 1012 for each type of feature to be written according to rules for that type of feature after a trigger pulse generated by trigger sensor 1008 is received. The trigger occurs once per revolution of the spun platform. The rate of revolution of the spun platform is synchronized to the pulse frequency of a stable electronic master clock which controls the pulsing of the light source so that for a 12-bit encoder, the platform revolves exactly once per 4096 clock pulses; for an 11-bit encoder, once per 2048 clock pulses; for a 10-bit encoder, once per 1024 clock pulses.

The method for writing 12 bits worth (4096) of codes are as follows (first clock pulse is #0, last clock pulse is #4095):
fiducial bars write 4096 times per trigger every clock pulse; the accuracy with which this feature can be recorded limits the accuracy of the device; in fact, this feature is the only one which requires critical recording.
markers write 4096 times per trigger every clock pulse.
code bit 0 starting with clock pulse 0, write 2048 times per trigger (one clock pulse on/one clock pulse off) (a total of 4,096 clock pulses)

code bit 1 starting with clock pulse 0, write 1024 times per trigger (2 clock pulses on/2 clock pulses off) (a total of 4,096 clock pulses)

code bit 2 starting with clock pulse 0, write 512 times per trigger (4 clock pulses on/4 clock pulses off) (a total of 4,096 clock pulses)

code bit 3 starting with clock pulse 0, write 256 times per trigger (8 clock pulses on/8 clock pulses off) (a total of 4,096 clock pulses)

code bit 4 starting with clock pulse 0, write 128 times per trigger (16 clock pulses on/16 clock pulses off) (a total of 4,096 clock pulses)

code bit 5 starting with clock pulse 0, write 64 times per trigger (32 clock pulses on/32 clock pulses off) (a total of 4,096 clock pulses)

code bit 6 starting with clock pulse 0, write 32 times per trigger (64 clock pulses on/64 clock pulses off) (a total of 4,096 clock pulses)

code bit 7 starting with clock pulse 0, write 16 times per trigger (128 clock pulses on/128 clock pulses off) (a total of 4,096 clock pulses)

code bit 8 starting with clock pulse 0, write 8 times per trigger (256 clock pulses on/256 clock pulses off) (a total of 4,096 clock pulses)

code bit 9 starting with clock pulse 0, write 4 times per trigger (512 clock pulses on/512 clock pulses off) (a total of 4,096 clock pulses)

code bit 10 starting with clock pulse 0, write 2 times per trigger (1024 clock pulses on/1024 clock pulses off) (a total of 4,096 clock pulses)

code bit 11 starting with clock pulse 0, write 1 time per trigger (2048 clock pulses on/2048 clock pulses off) (a total of 4,096 clock pulses)

The pattern sizes of master and submaster masks are chosen for supplying manageable magnifications by two stages of relay and for ease of manipulating subaperturing masks in front of master masks when selecting the type of pattern feature for projection. As noted above, the projection can also be accomplished with one stage of demagnification.

Assuming that the code bits are the smallest limiting feature size that it is desirable to end up with on the finished encoder scale, then one can work backwards through some reasonable magnification to the submaster mask and again through another magnification to the master mask. A 4 $\mu$m square code bit on the scale is taken as the smallest feature. If the submaster mask is set to scale magnification at 20×, then the pattern size on the submaster mask is 80 $\mu$m. The size of the entire area of the submaster mask is then 30 times this size for the baseline encoder pattern or 2.4 mm. Another magnification of 10× gives a master mask pattern size of 800 $\mu$m and an overall size of the master mask of roughly 24 mm. Master and submaster masks of this feature size are trivial to fabricate.

As those skilled in the art who have reviewed this specification will readily appreciate, an encoder according to the present claimed invention can be optimized by choices of components, opto-mechanical layout, and scale pattern details. There is an optimum fiducial feature pattern for a given geometric/CCD configuration which yields the most reliable outcome with the highest sensitivity and accuracy with respect to position. While the configurations of fiducials 31, 131, 231 and 331 disclosed above have worked in laboratory trials, other fiducials may be selected to satisfy the needs of specific equipment.

The use of a larger, more sophisticated CCD array allows simultaneous acquisition of several fiducial images. Position data become more accurate if independent determinations can be made for the images of more than one fiducial on the array. It is preferable to select the scale pattern, optical magnification and detector geometry to provide the image of at least one fiducial (or, even more preferably, more than one) on the CCD array at all times with more than one fiducial in view at all times, changes in magnification can easily be corrected. Thus, the system is scale invariant.

Absolute encoding of long linear or rotational motions with ultra-high sensitivity is possible with the present invention. Encoder 1, using the components and scale patterns disclosed above, with a 12-bit coding scheme, allows up to 4,096 positions spaced 80 $\mu$m apart, thus encoding motion of up to 0.33 m with a sensitivity of 10 nm. That is, both the sensitivity and the range are considerably increased over the prior art, even though a much coarser pattern is used on the scale. The coarser pattern allows for a decrease in both manufacturing costs and sensitivity to damage to the scale. Also, encoding rates of up to one kHz are possible with a CCD type image sensor. Much higher encoding rates are possible with charge injection device (CID) or optical random access memory (RAM) types of image sensors but with some possible degradation in accuracy and sensitivity.

Each additional bit in the coding scheme doubles the length of travel which can be encoded without affecting the sensitivity. A coding scheme of 16 bits would encode over 5 m, while a coding scheme of 20 bits would encode over 80 m. Practical concerns for such a length would include the accuracy with which multiple scales could be joined end-to-end or with which a single large scale could be made. Thermal expansion of the scale would also impair accuracy, however, the use of ultra-low-expansion (ULE) glass as a substrate for scale 5 would reduce the effects of such thermal expansion.

Because the modifications noted above and other modifications are possible within the scope of the present invention, the present invention should be construed as limited only by the appended claims.

I claim:

1. An optical encoder for determining an absolute position of an object, the optical encoder comprising:

a scale having a pattern formed thereon, the pattern having a plurality of periods, each of the plurality of periods including (a) a first portion which is identical for all of the plurality of periods and (b) a second portion which identifies said each of the plurality of periods;

means for causing relative motion between the scale and the object;

means for illuminating the scale;

means for receiving light from the scale, the means for receiving comprising detector means for forming an image of one of the plurality of periods of the pattern which lies within a field of view of the detector means and for outputting signals derived from the image, the field of view defining a fixed coordinate system; and analyzing means, receiving the signals from the detector means, for (i) determining a location of the first portion of the one of the plurality of periods within the fixed coordinate system, (ii) decoding the second portion of. the one of the plurality of periods to derive an identity of the one of the plurality of periods; and (iii) determining the absolute location of the object in accordance with the location of the first portion determined in operation (i) and the identity determined in operation (ii).

2. An optical encoder as in claim 1, wherein the means for receiving further comprises:

a camera head containing the detecting means; and means for focusing the light received from the scale onto the detecting means so that the detecting means forms the image.

3. An optical encoder as in claim 2, wherein the means for focusing comprises a microscope optical system.

4. An optical encoder as in claim 2, wherein the detecting means comprises an array of photodetector elements.

5. An optical encoder as in claim 4, wherein the detecting means comprises a charge-coupled device array which comprises the array of photodetector elements.

6. An optical encoder as in claim 1, wherein the analyzing means comprises an analog/digital converter for converting the signals into digital data.

7. An optical encoder as in claim 6, wherein the analyzing means further comprises an image memory for storing the digital data.

8. An optical encoder as in claim 7, wherein the analyzing means further comprises an image processor for performing operations (i), (ii) and (iii) in accordance with the digital data.

9. An optical encoder as in claim 1, wherein the first portion of said each of the plurality of periods comprises at least one bar-shaped mark whose long axis is perpendicular to a direction of motion of the scale.

10. An optical encoder as in claim 9, wherein the second portion of said each of the plurality of periods comprises a plurality of markings which provide a binary encoding of a number identifying said each of the plurality of periods.

11. An optical encoder as in claim 1, wherein:

the pattern comprises transparent markings on an opaque background; and the means for illuminating and means for receiving are on opposite sides of the scale, so that the light is transmitted through the transparent markings.

12. An optical encoder as in claim 1, wherein:

the absolute position is an absolute linear position; and the means for causing relative motion comprises means for attaching the scale to the object to move linearly with the object.

13. An optical encoder as in claim 1, wherein:

the absolute position is an absolute angular position; and the means for causing relative motion comprises means for causing relative rotational motion between the object and the scale about an axis which passes through a center of the scale.

14. An optical encoder as in claim 1, wherein operation (i) performed by the analyzing means comprises an operation of locating a one-dimensional centroid of the first portion in a direction of motion of the scale relative to the fixed coordinate system.

15. A method of determining an absolute position of an object, the method comprising:

(a) providing a scale having a pattern formed thereon, the pattern having a plurality of periods, each of the plurality of periods including (i) a first portion which is identical for all of the plurality of periods and (ii) a second portion which identifies said each of the plurality of periods;

(b) causing relative motion between the scale and the object;

(c) forming an image of one of the plurality of periods of the pattern which lies within a field of view, the field of view defining a fixed coordinate system;

(d) determining, in accordance with the image, a location of the first portion of the one of the plurality of periods within the fixed coordinate system;

(e) decoding, in accordance with the image, the second portion of the one of the plurality of periods to derive an identity of the one of the plurality of periods; and (f) determining the absolute location of the object in accordance with the location of the first portion determined in step (d) and the identity determined in step (e).

16. A method as in claim 15, wherein:

the absolute position is an absolute linear position; and step (b) comprises attaching the scale to the object to move linearly with the object.

17. A method as in claim 15, wherein:

the absolute position is an absolute angular position; and step (b) comprises causing relative rotational motion between the object and the scale about an axis which passes through a center of the scale.

18. A method as in claim 15, wherein the first portion of said each of the plurality of periods comprises at least one bar-shaped mark whose long axis is perpendicular to a direction of motion of the scale.

19. A method as in claim 18, wherein the second portion of said each of the plurality of periods comprises a plurality of pixels which provide a binary encoding of a number identifying said each of the plurality of periods.

20. A method as in claim 15, wherein step (d) comprises locating a one-dimensional centroid of the first portion in a direction of motion of the scale relative to the fixed coordinate system.

* * * * *